United States Patent [19]

Hamilton

[11] Patent Number: 5,554,674
[45] Date of Patent: Sep. 10, 1996

[54] FLAME RETARDANT MOLDING THERMOPLASTICS

[75] Inventor: Douglas G. Hamilton, Mt. Vernon, Ind.

[73] Assignee: General Electric Company, Pittsfield, Mass.

[21] Appl. No.: 418,987

[22] Filed: Apr. 7, 1995

[51] Int. Cl.⁶ .............................. C08K 5/04; C08K 3/32
[52] U.S. Cl. ............................ 524/288; 524/417
[58] Field of Search ..................... 524/417, 141, 524/145, 127, 288

[56] References Cited

U.S. PATENT DOCUMENTS

| | | | |
|---|---|---|---|
| 3,479,319 | 11/1969 | Hergenrother | 524/417 |
| 3,940,367 | 2/1976 | Pelousek et al. | 524/141 |
| 3,953,394 | 4/1976 | Fox | 524/141 |
| 3,953,539 | 4/1976 | Kawase et al. | 524/141 |
| 4,871,795 | 10/1989 | Pawar . | |
| 5,135,973 | 8/1992 | Fukasawa et al. | 524/127 |
| 5,346,767 | 9/1994 | Tilley et al. . | |
| 5,354,791 | 10/1994 | Gallucci . | |
| 5,367,011 | 11/1994 | Walsh . | |
| 5,411,999 | 5/1995 | Gallucci . | |

FOREIGN PATENT DOCUMENTS

0264143A1  4/1988  European Pat. Off. .

*Primary Examiner*—Veronica P. Hoke

[57] ABSTRACT

A flame retardant thermoplastic composition of at least one thermoplastic resin, at least about 20 percent by weight of an inorganic filler, and effective flame retarding amount of a metal acid pyrophosphate, and optionally, an impact modifier, an anti-drip agent and/or a second flame retardant.

22 Claims, No Drawings

FLAME RETARDANT MOLDING THERMOPLASTICS

The present invention is concerned with stable blends which comprise thermoplastic resins which are rendered flame retardant with a brominated flame retardant and a metal acid pyrophosphate compound.

BACKGROUND OF THE INVENTION

Thermoplastic molding compositions are based on a thermoplastic resin and are widely used for the injection molding or extrusion of many products. In many applications it is necessary to add materials to the composition which will impart flame retardance to the molded article. In the prior art many additives have been used for this purpose. For example, U.S. Pat. No. 3,915,926 discloses a composition of a polycarbonate and a brominated flame retardant in combination with an antimony compound. Generally, it has been found that when a brominated compound has been used as the sole flame retardant additive, the composition has not been rendered sufficiently flame retardant so that it passes the Underwriters Laboratory No. 94 test and receives a V0 rating. The antimony compound was added to the composition to act as synergist for the brominated flame retardant to obtain a V0 rating.

Organic phosphates have also been added to thermoplastic compositions to impart flame retardant properties. It is theorized that the organic phosphates act as flame retardants because they volatilize when exposed to the intense heat that is generated by contact with an open flame and form a protective barrier close to the surface of the thermoplastic material in which they are dispersed.

Copending application Ser. No. 07/994,794, filed Dec. 22, 1992 (now abandoned), by Richard C. Crosby and Douglas G. Hamilton discloses that polyacid pyrophosphates are used to stabilize polyester-polycarbonate compositions.

U.S. Pat. No. 5,367,011, filed by Eileen Walsh discloses that polyacid pyrophosphates are used to stabilize homopolymer blends of polyester compositions.

It has been surprisingly discovered that thermoplastic compositions may be rendered flame retardant, obtaining a V0 flame rating under Underwriters Laboratories Test No. 94, by the addition of effective amounts of a metal acid pyrophosphate and a halogenated flame retardant. This is unexpected because metal acid pyrophosphate compounds are inorganic and are not considered volatile. It has also been found that this flame retardance is obtainable without the use of an antimony oxide synergist.

SUMMARY OF THE INVENTION

The invention provides compositions comprising:

(a) 20–90 weight percent of a single thermoplastic resin or a heteropolymer thermoplastic resin blend;

(b) 5–65 weight percent of a halogenated flame retardant; and (c) 10–70 weight percent of a metal acid pyrophosphate of the formula:

$$M^z_x H_y P_n O_{3n+1}$$

wherein M is a metal, x is a number from 1 to 12, y is a number from 1 to 12, n is a number from 2 to 10, z is a number from 1 to 5, and the sum of (xz)+y is equal to n+2; wherein all weight percentages are based upon the weight of the total composition. The thermoplastic resin may be a polyester such as poly(butylene terephthalate), poly(cyclohexylene, terephthalate), poly(ethylene terephthalate), individually, or a mixture of such polyester with other nonpolyester thermoplastic resins.

The compositions may also contain fillers; impact modifiers; other thermoplastic resins, such as, for example, aromatic polycarbonates; anti-drip additives; organic phosphates; and stabilizers, or mixtures of the foregoing.

The invention also includes articles molded from the such compositions and methods of rendering thermoplastics flame retardant.

DETAILED DESCRIPTION OF THE INVENTION

The thermoplastic resin according to the invention is a single thermoplastic resin or a heteropolymer thermoplastic resin blend. Suitable thermoplastic resins include, for example, polyesters, polyethers, polyamides, polyolefins, polycarbonates, including mixtures of these polymers provided that such mixture constitutes a heteropolymer blend. By the term "heteropolymer thermoplastic resin blend" it is meant a blend of two polymers from differing classes of polymers, such as blends of the foregoing but excluding blends of two polymers from within the same class of polymers, e.g., polyester/polyester blends, etc. As polyester resins constitute the most preferred single thermoplastic resins, the invention will be described using polyesters as the example.

Polyesters suitable for preparing the present compositions include those comprising structural units of the formula (I):

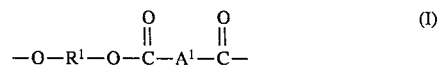

wherein each $R^1$ is independently a divalent aliphatic hydrocarbon, alicyclic hydrocarbon, aromatic hydrocarbon, polyoxyalkylene radical, or mixtures thereof and each $A^1$ is independently a divalent aliphatic, alicyclic or aromatic radical, or mixtures thereof. Examples of suitable polyesters containing the structure of formula (I) are poly(alkylene dicarboxylates), elastomeric polyesters, liquid crystalline polyesters, polyarylates, and polyester copolymers such as copolyestercarbonates. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram.

The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (I) is most often p- or m-phenylene or a mixture thereof. As previously noted, this class of polyester includes the poly(alkylene terephthalates) and the polyarylates. Such polyesters are known in the art as illustrated by the following U.S. Patents, which are incorporated herein by reference:

| 2,465,319 | 2,720,502 | 2,727,881 | 2,822,348 |
| --- | --- | --- | --- |
| 3,047,539 | 3,671,487 | 3,953,394 | 4,128,526 |

The poly(alkylene terephthalates), for example, poly(ethylene terephthalate)(commonly abbreviated as "PET"), poly(cyclohexylene terephthalate)(commonly abbreviated as "PCT"), and poly(butylene terephthalate)(commonly abbreviated as "PBT")are often the preferred polyesters for the present invention, with poly(ethylene terephthalate) (PET) being the most preferred member. Various mixtures of PET, PCT and PBT are also sometimes very suitable.

The polyester may optionally include structural units of the formula (II):

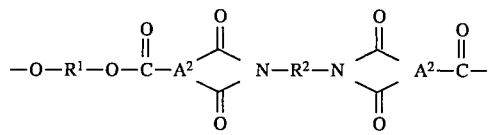

wherein $R^1$ is as previously defined. $R^2$ is a polyoxyalkylene radical and $A^2$ is a trivalent aromatic radical, usually derived from trimellitic acid and has the structure (III):

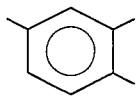

Such polymers and their mode of preparation are described for example in U.S. Pat. Nos. 4,544,734, 4,556,705, and 4,556,688, which are all incorporated herein by reference.

Because of the tendency of polyesters to undergo hydrolyric degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

The halogenated flame retardants include those halogenated compounds that are compatible with thermoplastic resins. Examples of these compounds include those of the formula (IV):

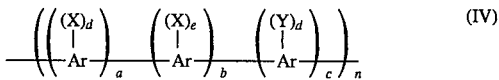

wherein n is 1 to 10 and R is an alkylene, alkylidene or cycloaliphatic linkage, e.g., methylene, ethylene, propylene, isopropylene, isopropylidene, butylene, isobutylene, amylene cyclohexylene, cyclopentylidene, and the like; a linkage selected from the group consisting of ether, carbonyl; amine; a sulfur containing linkage, e.g., sulfide, sulfoxide, sulfone, carbonate; a phosphorus containing linkage; and the like. R can also consist of two or more alylene or alkylidene linkages connected by such groups as aromatic, amino, ether, ester, carbonyl, sulfide, sulfoxide, sulfone, a phosphorus-containing linkage, and the like. R can be a dihydric phenol, e.g., bisphenol-A, or a carbonate linkage.

Other groups which are represented by R will occur to those skilled in the art. Compounds of this type are disclosed in U.S. Pat. Nos. 3,647,747 and 3,334,154 both of which are incorporated by reference.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine; (2) ether groups of the general formula OE, wherein E is a monovalent hydrocarbon radical similar to X; (3) monovalent hydrocarbon groups of the type represented by R; or (4) other substituents, e.g., nitro, cyano, etc., said substituents being essentially inert provided there is at least one and preferably two halogen atoms per aryl, e.g, phenyl.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclo-hexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise, either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are di-aromatics of which the following are representative:
2,2-bis-(3,5-dichlorophenyl)propane;
bis-(2-chlorophenyl)methane;
bis-(2,6-dibromophenyl)methane;
1,1-bis-(4-iodophenyl)ethane;
1,2-bis-(2,6-dichlorophenyl)ethane;
1,1-bis-(2-chloro-4-iodophenyl)ethane;
1,1-bis-(2-chloro-4-methylphenyl)ethane;
1,1-bis-(3,5-dichlorophenyl)ethane;
2,2-bis-(3-phenyl-4-bromophenyl)ethane;
2,3-bis-(4,6-dichloronaphthyl)propane;
2,2-bis-(2,6-dichlorophenyl)pentane;
2,2-bis-(3,5-dichromophenyl)hexane;
bis-(4-chlorophenyl)phenylmethane;
bis-(3,5-dichlorophenyl)cyclohexylmethane;
bis-(3-nitro-4-bromophenyl)methane;
bis-(4-hydroxy-2,6-dichloro-3-methoxyphenyl)methane;
2,2-bis-(3,5-dichloro-4-hydroxyphenyl)propane;
2,2-bis-(3,5-dibromo-4-hydroxyphenyl)propane; or
2,2-bis-(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabrombenzene, and biphenyls such as 2,2'-dichlorobiphenyl, 2,4'-dibromobiphenyl, 2,4'-dichlorobiphenyl, hexabromobiphenyl, octabromobiphenyl, decarbromobiphenyl and halogenated diphenyl ethers containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

The brominated polycarbonates will comprise units of the formula (V):

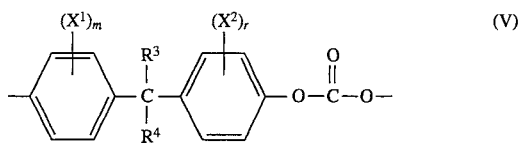

where $R^3$ and $R^4$ are hydrogen (lower alkyl) or phenyl, $X^1$ and $X^2$ are bromo and m and r are from 1 to 4, the average number of repeating units being from about 2 to 20, and, optionally, a second component of the combination having an aromatic homopolymer comprising units of this formula:

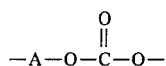

wherein A is a divalent aromatic radical of the dihydric phenol. Preferably, they will comprise repeating units of the formula (VI):

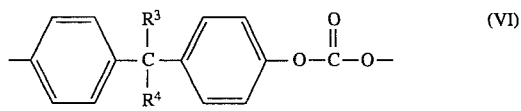

$R^3$ and $R^4$ are the same as hereinabove identified, the average number of repeating units being at least 100, and preferably from about 100 to about 400.

With respect to such homopolymer components having from about 2 to 20 repeating units, the preferred compounds will be further characterized as having low volatility when heated above 200° C.

This may be achieved by balancing the amount of halogen with the number of units in the chain, as is obvious to those who are skilled in the art. Such compounds can be prepared by reacting a carbonate precursor with a mixture of a halogenated dihydric phenol and a chain stopper. The carbonate precursor may be either a carbonyl halide or a haloformate. Among the carbonyl halides may be mentioned carbonyl bromide, carbonyl chloride, carbonyl fluoride and the like. Suitable haloformates will include the bischloroformate of tetrabromobisphenol-A or the chloroformate of tribromophenol(a chain stopper) all used together with phosgene, and the like. In all cases, phosgene is the preferred reactant for the dihydricphenols.

The halogenated dihydric phenols preferred for use in preparing the homopolymer of 2 to 20 units used in the invention may be of the formula (VII):

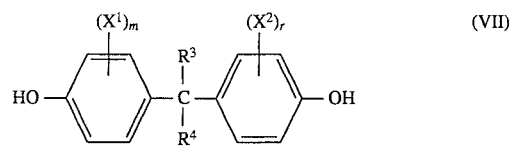

wherein $X^1$, $X^2$, $R^3$, $R^4$, m and r are as defined above. In all cases (lower) alkyl means straight and branched chain alkyl groups of from 1 to about 6 carbon atoms. These dihydric phenols may be made in ways known to those who are skilled in the chemical arts, e.g. by the condensation of an unsubstituted or halogen substituted phenol and with the corresponding phenol and with the corresponding ketone, see e.g. U.S. Pat. No. 2,468,982, then this step is followed by the bromination of the aromatic rings.

Illustrative of the dihydric phenols most useful in the preparation of the chain stopped homopolymers of 2 to 20 units used in this invention are: 2,2-bis(3,5-dibromo-4-hydroxyphenyl)methane; bis-(2-bromo-4-hydroxy Phenyl) methane; bis(2,6-dibromo-4-hydroxyphenyl)methane; 1,2-bis( 2,6-dibromo-4-hydroxyphenyl)ethane; 1,1-bis(3,5-dibromo-4-hydroxyphenylethane; 2,2-bis(2,6-dibrome-4-hydroxyphenyl)pentane; 3,3-bis( 2,6-dibromo-4-hydroxyphenyl)hexane; bis(3,5-dibromo-4-hydroxyphenyl)cyclohexylmethane; 2,2-bis(4-hydroxy-2,3, 5,6-tetrabromophenyl)propane; and the like. Especially preferred is the commercially available compound tetrabromobisphenol-A.

Those who, are skilled in the art will realize that a wide variety of chain stopper compounds can be used in the preparation of from 2 to 20 monofunctional and reactive with the end groups of the repeating units. Usually the end groups will be reactive derivatives of a carbonate precursor, as defined above, so that any monofunctional compound capable of reacting with a carbonyl halide, a carbonate ester or a haloformate will suffice. Merely by way of illustration, there can be used organic monohydroxy compounds, as well as carboxylic acids or halides and many others. Particularly suitable are organic hydroxy compounds, such as alcohols, e.g. methanol, ethanol, decanol, and the like and phenols. Particularly preferred as chain stopping compounds are organic phenols and bromo-substituted phenols. The latter chain stoppers give rise to chain stopped components for use in the present compositions which have terminal substituents of the formula (VIII):

and

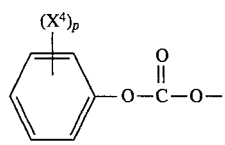

wherein $X^3$ and $X^4$ are bromo and p and q are each an integer of from 1 to 5. The respective phenols can be made by procedures well known to those who are skilled in the art. Illustrative of such phenols are, 3-, 4-bromophenol and 2,3- 2,4- 2,5- 2,6- 3,5- and 3,4-dibromophenol; 2,3,5- and 2,4, 6-tribromophenol; 2,3,4,6- and 2,3,4,5-tetrabromophenol; and 2,3,4,5,6-pentabromophenol. Especially preferred endcaps include 2,4,6-tribromophenol and p-cumylphenol.

The chain-stopped polymers of carbonates of the brominated dihydric phenols having an average of about 2 to 20 units in the chain are prepared by reacting a carbonate precursor with a mixture of the dihydric phenol and the chain stopper preferably in an inert solvent, and in the presence of an acid acceptor, until condensation is complete. It is necessary to use at least the stoichiometric amount of the carbonate precursor, and preferably an excess. Under such conditions, the ratio of the dihydric phenol to the monofunctional chain stopper will control the number of repeating dihydric phenol-carbonate units in the chain. If 2 moles of chain stopper are used, for example, the average number of repeating units, or n, as above defined will be 2 and the product will have a relatively low softening point. If, on the other hand, 10 or 20 moles of dihydric phenol and 2 moles of chain stopper are used, the average number of repeating units, n, will be about 10 to 20 as the case may be. It is preferred that the average number of repeating units, n, will be between about 3 and about 7 and it especially preferred that they be about 5. Accordingly, the molar ratio of dihydric phenol to chain stopper will preferably range from 3-7 to 2, and especially preferably will be about 5 to 2. If the product comprises a poly(tetrabromobisphenol-A carbonate), chain stopped with 2,4,6-tribromophenol, such preferred ranges of repeating units will provide very useful softening points of 230° to 260° C. and from 230° to 240° respectively. Such compounds will have a high bromine content i.e. 56-59% and a weight average molecular weight of about 3,000 to 3,500.

The metal acid pyrophosphates are of the formula (IX):

$$M^z_x H_y P_n O_{3n+1} \qquad (IX)$$

wherein M is a metal, x is a number from 1 to 12, y is a number from 1 to 12, n is a number from 2 to 10, z is a number from 1 to 5 and the sum of (xz)+y is equal to n+2.

These compounds include, for example, $Na_3HP_2O_7$; $K_2H_2P_2O_7$; $Na_4P_2O_7$; $KNaH_2P_2O_7$ and $Na_2H_2P_2O_7$. The particle size of the metal acid pyrophosphate should be less than 75 microns, preferably less than 50 microns and most preferably less than 20 microns. Generally from 10 to 70 wt. % of the metal acid pyrophosphate may be used to impart a flame retardant effect. It is preferred to use a range of from 10 to 45 wt. % or especially preferably from 10 to 35 wt. % to achieve a higher degree of flame retardancy or even 10 to 15 wt. % for selected applications.

The other thermoplastic resins according to the invention, i.e., the polyethers, polyamides, polyolefins, polycarbonates, etc., are all well known to those skilled in the art. As indicated earlier, these thermoplastic resins can be used alone, in combination with the above-described polyesters, or in a heteropolymer thermoplstic resin blend with other than polyester resins. One of the most preferred among the other thermoplastic resins is polycarbonate resin.

If desired, an organic flame retardant phosphate may be substituted for the halogenated flame retardants of the composition at a level of from an effective amount up to about 25 weight percent or more, preferably at a level of from 5-15 weight percent. The organic phosphates are well known and are described in U.S. Pat. No. 4,033,927 which is incorporated by reference.

In general, the preferred organic phosphate compounds are of the general formula (XI):

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Qs is aryl. Typical examples of suitable phosphates include phenylbisdodecyl phosphate, phenylbisneopentyl phosphate, phenylethylene hydrogen phosphate, phenyl-bis-(3,5,5'-trimethylhexyl phosphate), ethyldiphenyl phosphate, bis(2-ethylhexyl)-p-tolylphosphate, tritolyl phosphate, bis(2-ethylhexyl)-phenyl phosphate, tri(nonylphenyl)phosphate, phenylmethyl hydrogen phosphate, di(dodecyl)-p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, resorcinol diphosphate and the like.

It may be desirable to add an impact modifier which is based on a high molecular weight styrene-diene rubber or an acrylate rubber at a level of from 1 to 30 weight percent or more preferably from 5 to 15 weight percent. A preferred class of rubber materials are copolymers, including random, block and graft copolymers of vinyl aromatic compounds and conjugated dienes. Exemplary of these materials there may be given hydrogenated, partially hydrogenated, or non-hydrogenated block copolymers of the A-B-A and A-B type wherein A is polystyrene and B is an elastomeric diene, e.g. polybutadiene, polyisoprene, radial teleblock copolymer of styrene and a Y conjugated diene, acrylic resin modified styrene-butadiene resins and the like; and graft copolymers obtained by graft-copolymerization of a monomer or monomer mix containing a styrene compound as the main component to a rubber-like polymer. The rubber-like polymer used in the graft copolymer are as already described herein including polybutadiene, styrene-butadiene copolymer, acrylonitrile-butadiene copolymer, ethylene-propylene copolymer, ethylene-butylene copolymer polyacrylate and the like. The styrene compounds includes styrene, methylstyrene, dimethylstyrene, isopropylstyrene, alphamethylstyrene, ethylvinyltoluene and the like. Procedures for the preparation of these polymers are found in U.S. Pat. Nos. 4,196,116; 3,299,174 and 3,333,024, and of which are incorporated by reference.

If desired, reinforcing fillers such as glass fibers or carbon fibers or non-reinforcing fillers such as talc, clay, mica, glass spheres, wollastonite, and the like may be added. In addition, stabilizers, lubricants, flow aid, colorants, etc. may be added. Reinforcing fillers may be added at a level of 1 to 40 weight percent or more preferably for 20 to 40 weight percent. If non-reinforcing fillers are used they may be added at a level of from 1-50 weight percent or more preferably at a level of from 10 to 30 weight percent.

The filamentous glass which may be employed as a reinforcing agent in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass, however, other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3 to about 20 microns, but this is not critical to the present invention. It is known, however, to those skilled in the art, that smaller filament diameters will also increase the strength of plastics treated therewith.

The length of the glass filaments and whether or not they are bundled into fibers and the fibers bundles in turn to yarns, robes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur. From 5–45 weight percent of glass fiber may be used or more preferably from 10–30 weight percent of glass fiber may be used for most applications.

Polytetrafluoroethylene may be added to enhance flame retardance as an anti-drip inhibitor. These polymers are described in U.S. Pat. No. 3,005,795 which is incorporated by reference. Generally from 0.01–10 weight percent and more preferably from 0.01–5 weight percent of the polytetrafluoroethylene may be utilized.

Antioxidants such as octadecyl (3,5-di-ter-butyl-4-hydroxyhydro cinnamate) methane may be used at a level of from 0.05 to 1 wt. %.

Preferred compositions include the following:

| Preferred Composition A: | |
|---|---|
| polybutylene terephthalate | 25–65 wt. % |
| sodium dihydrogen pyrophosphate | 10–45 wt. % |
| brominated polycarbonate | 25–65 wt. % |
| fibrous glass | 5–40 wt. % |
| polytetrafluroethylene | 0–5 wt. % |
| processing additives | 0–1.5 wt. % |

| Preferred Composition B: | |
|---|---|
| polybutylene terephthalate | 1–65 wt. % |
| polycarbonate | 1–65 wt. % |
| sodium dihydrogen pyrophosphate | 10–45 wt. % |
| brominated polycarbonate | 25–65 wt. % |
| fibrous glass | 5–40 wt. % |
| polytetrafluoroethylene | 0–5 wt. % |
| processing additives | 1–1.5 wt. % |

With the proviso that at least 25 weight percent of the composition consists of polybutylene terephthalate and polycarbonate.

| Preferred composition C: | |
|---|---|
| polyethylene terephthalate | 25–65 wt. % |
| sodium dihydrogen pyrophosphate | 10–45 wt. % |
| brominated polycarbonate | 25–65 wt. % |
| fibrous glass | 5–45 wt. % |
| polytetrafluorethylene | 0–5 wt. % |
| processing additives | 0–1.5 wt. % |

| Preferred composition D: | |
|---|---|
| polybutylene terephthalate | 25–75 wt. % |
| sodium dihydrogen pyrophosphate | 10–45 wt. % |
| brominated polycarbonate | 25–70 wt. % |
| polytetrafluorethylene | 0–5 wt. % |
| processing additives | 0–1.5 wt. % |

As used herein and in the appended claims, the term "weight percent" means the percent by weight of each component based on the total weight of composition.

The invention also includes the novel articles made from the compositions of the invention.

Articles may be formed from the compositions of the invention by extrusion which may be carried out by extrusion of pelletized resin followed by molding. Preferred extrusion conditions are 480° F. die temperature, 420°–520° F. barrel temperature.

EXAMPLES

The following examples are presented in order to illustrate the present invention. They are not to be construed to limit the scope of the appended claims.

Example 1 And Comparative Example A

The following compositions were prepared by tumble blending the ingredients, extruding in a 2.5 inch vented single screw extruder with a melt temperature of 500° to 530° F. They are dried and molded on an 80 ton Van Dorn injection molding machine at a temperature of 500° C. and a mold temperature of 150° C.

| | Example 1 | Comparative Example A |
|---|---|---|
| PBT[a] | 36.15 | 36.15 |
| Brominated polycarbonate[b] | 32.2 | 32.2 |
| Glass fiber | 20.0 | 30.0 |
| PTFE concentrate[c] | 2.0 | 2.0 |
| $Na_2H_2P_2O_7$ | 10 | 0.3 |
| Antioxidant[d] | 0.15 | 0.15 |
| Mold release[e] | 0.2 | 0.2 | a. Valox 295, polybutylene terephthalate, GE Co., 900–1300 poise (ASTM method D-1238; Tinius Olsen melt indexer at 250° C., 0.0825 inch orifice).

b. A 50:50 copolymer of bisphenol-A and tetrabromobisphenol-A having an IV of 0.34 dl/g. as measured in methylene chloride at 25° C.

c. A composition of polytetrafluoroethylene and a polycarbonate of bishphenol-A prepared according to Example 1 of U.S. Pat. No. 5,102,696 which is incorporated by reference.

d. Octadecyl (3,5-di-tert-butyl-4-hydroxyhydrocinnamate)methane.

e. 10% polyethylene, 60% paraffin waxes and 30% high molecular weight olefins.

Test Results:

Test pieces 1/32" thick were tested according to Underwriters Laboratories Test No. 94 and the following results were obtained:

|  | Example 1 | Comparative Example A |
|---|---|---|
| Unaged | V0 | VII |
| Average FOT* | 1.45 | 4.86 |
| Aged** | V0 | VI |
| Average FOT* | 1.07 | 6.41 |

*FOT is flame out time.
**Sample was aged 7 days at 70° C. according to Underwriters Laboratories Test Procedure No. 94.

Example 2 and Comparative Example B

The following example illustrates the novel compositions of the invention. The blend is prepared by tumble blending the ingredients, extruding in a 2.5 inch vented single screw extruder with a melt temperature of 500° to 530° F. They are dried and molded on an 80 ton Van Dorn injection molding machine at a temperature of 500° C. and a mold temperature of 150° C.

|  | Example 2 | Comparative Example B |
|---|---|---|
| PBT$^a$ | 32.65 | 32.65 |
| Brominated polycarbonate$^b$ | 30.00 | 30.00 |
| Glass fiber | 25.00 | 35.00 |
| Sodium acid pyrophosphate | 10.00 | — |
| PTFE Concentrate$^c$ | 2.00 | 2.00 |
| Antioxidant$^d$ | 0.15 | 0.15 |
| Mold release$^e$ | 0.20 | 0.20 | a,b,c,d and e are described in Example.

Test pieces 1/32" thick were tested according to Underwriters Laboratories Test No. 94 and the following results were obtained:

|  | Example 2 | Comparative Example B |
|---|---|---|
| Unaged | V0 | VII |
| Aged | V0 | VII |

Example 3

The following composition was prepared using the same general procedure that was employed for the preparation of Example 1:

| PBT$^a$ | 32.45 |
|---|---|
| PET$^f$ | 3.00 |
| Brominated polycarbonate$^b$ | 32.20 |
| Glass fiber | 20.00 |
| Sodium acid pyrophosphate | 10.00 |
| Antioxidant$^d$ | 0.15 |
| Mold release$^e$ | 0.20 | a,b,d and e are described in Example 1; f is polyethylene terephthalate having an IV of 0.57 dl/g in 60:40 phenol-tetrachloroethane at 25° C.

Test pieces 1/32" thick were tested according to Underwriters Laboratories Test No. 94 and the following results were obtained:

|  | Example 3 |
|---|---|
| Unaged | V0 |
| Ages | V0 |

Example 4

The following composition was prepared using the same procedure that was set forth in Example 1:

| PET$^f$ | 35.65 |
|---|---|
| Brominated polycarbonate$^b$ | 32.0 |
| Glass fiber | 20.0 |
| PTFE concentrate$^c$ | 2.0 |
| Sodium acid pyrophosphate | 10.0 |
| Antioxidant$^d$ | 0.15 |
| Mold release$^e$ | 0.2 | b,c,d and e are the same as described in Example 1; f is described in Example 3.

Test Results:

Test pieces 1/32" thick were tested according to Underwriters Laboratories Test No. 94 and the following results were obtained:

|  | Example 4 |
|---|---|
| Aged Sample | V0 |
| Unaged Sample | V0 |

Example 5

The following composition was prepared using the same procedure that was set forth in Example 1:

|  | Example 5 |
|---|---|
| PET$^f$ | 35.65 |
| Brominated polycarbonate | 32.00 |
| Glass fiber | 15.00 |
| Sodium acid pyrophosphate | 15.00 |
| PTFE concentrate | 2.00 |
| Antioxidant$^d$ | 0.15 |
| Mold release | 0.20 |

Test Results:

Test pieces 1/32" thick were tested according to Underwriters Laboratories Test No. 94 and the following results were obtained:

|  | Example 5 |
|---|---|
| Unaged Sample | V0 |
| Aged Sample | V0 |

Example 6 and Comparative Example C

Using the same procedures of Example 1, the following compositions were prepared:

|  | Example 6 | Comparative Example C |
|---|---|---|
| PBT$^a$ | 33.50 | 48.5 |
| Brominated polycarbonate$^b$ | 33.50 | 48.5 |
| PTFE concentrate$^c$ | 1.5 | 1.5 |
| Sodium acid pyrophosphate | 30.35 | 0.35 |
| Antioxidant$^d$ | 0.15 | 0.15 |
| Mold release$^e$ | 1.0 | 1.0 |

These compositions had the following physical properties:

|  | Example 6 | Comparative Example C |
|---|---|---|
| Unaged 1/32" | V0 | VII |
| Aged 1/32" | V0 | VI |

(a)–(e) were the same as the materials of Example 1. Obviously, other modifications and variations of the present invention are possible in the light of the above teachings. It is, therefore, to be understood that changes may be made in the particular embodiments described above which are within the scope of the invention as defined in the appended claims.

I claim:

1. A thermoplastic composition containing a halogenated flame retardant absent an antimony containing synergist which comprises:
   (a) from 20–90 weight percent of a single thermoplastic resin or a heteropolymer thermoplastic resin blend;
   (b) from 5–65 weight percent of a halogenated flame retardant; and
   (c) a flame retardant enhancing additive absent an antimony containing synergist consisting essentially from about 5–70 weight percent of a metal acid pyrophosphate of the formula:

$$M^z_x H_y P_n O_{3n+1}$$

wherein M is a metal selected from the group consisting of alkali metals and alkaline earth metals, x is a number from 1 to 12, y is a number from 1 to 12, n is a number from 2 to 10, z is a number from 1 to 5, and the sum of xz+y is equal to n+2, all percentages being based on the weight of the total composition wherein said metal acid pyrophosphate is present in an amount sufficient to enhance the flame retardancy to a VO flame rating under Underwriters Laboratories Test No. 94.

2. The composition as defined in claim 1, wherein said single thermoplastic resin or a resin in the heteropolymer resin blend comprises a polyester resin.

3. The composition as defined in claim 1, wherein the amount of said metal acid pyrophosphate ranges from about 10 weight percent to about 35 weight percent by weight of total composition.

4. A composition as defined in claim 1, which further comprises from an effective amount to about 40 percent by weight of the total composition of a filler.

5. A composition as defined in claim 1, which further comprises from an effective amount to about 30 percent by weight of the total composition of a rubbery impact modifier.

6. A composition as defined in claim 2, which further comprises from an effective amount to about 70 percent by weight of the total composition of a polycarbonate resin.

7. A composition as defined in claim 1, which further comprises from an effective amount to about 10 percent by weight of the total composition of a. polytetrafluoroethylene anti-drip additive.

8. A thermoplastic flame retardant composition which comprises:
   (a) from 20–90 weight percent of a single thermoplastic resin or a heteropolymer thermoplastic resin blend;
   (b) from an effective amount to about 25 weight percent of an organic phosphate flame retardant; and
   (c) from about 5–70 weight percent of a metal acid pyrophosphate of the formula:

$$M^z_x H_y P_n O_{3n+1}$$

wherein M is a metal selected from the group consisting of alkali metals and alkaline earth metals, x is a number from 1 to 12, y is a number from 1 to 12, n is a number from 2 to 10, z is a number from 1 to 5, and the sum of xz+y is equal to n+2, all percentages being based on the weight of the total composition, wherein said flame retardant additives consist essentially of (b) and (c).

9. A composition as defined in claim 2, wherein said polyester resin is polyethylene terepthalate.

10. A composition as defined in claim 2, wherein said polyester resin is polybutylene terephthalate.

11. A thermoplastic composition containing a halogenated flame retardant absent an antimony containing synergist which comprises:
    (a) from 20–90 weight percent of a thermoplastic resin;
    (b) from 5–65 weight percent of a halogenated flame retardant; and
    (c) from about 12–70 weight percent of a metal acid pyrophosphate of the formula:

$$M^z_x H_y P_n O_{3n+1}$$

wherein M is a metal selected from the group consisting of alkali metals and alkaline earth metals, x is a number from 1 to 12, y is a number from 1 to 12, n is a number from 2 to 10, z is a number from 1 to 5, and the sum of xz+y is equal to n+2, all percentages being based on the weight of the total composition wherein said metal acid pyrophosphate is present in an amount sufficient to enhance the flame retardancy to a VO flame rating under Underwriters Laboratories Test No. 94.

12. The composition as defined in claim 11, wherein said thermoplastic resin comprises a polyester resin.

13. The composition as defined in claim 1, wherein the amount of said metal acid pyrophosphate ranges from about 15 weight percent to about 35 weight percent by weight of the total composition.

14. A composition as defined in claim 11, which further comprises from an effective amount to about 30 percent by weight of the total composition of a rubbery impact modifier.

15. A composition as defined in claim 11, which further comprises from an effective amount to about 70 percent by weight of the total composition of a polycarbonate resin.

16. A composition as defined in claim 1, consisting essentially of:
    (a) from 20–65 weight percent of a single thermoplastic resin or a heteropolymer thermoplastic resin blend;
    (b) from 25–65 weight percent of a brominated aromatic polycarbonate;
    (c) from 10–45 weight percent of sodium acid pyrophosphate;
    (d) from 5–45 weight percent of glass fiber; and
    (e) from 0–5 weight percent of a polytetrafluoroethylene drip inhibitor.

17. A composition as defined in claim 1, consisting essentially of:
    (a) from 25–65 weight percent of polybutylene terephthalate;
    (b) from 25–65 weight percent of a brominated aromatic polycarbonate;
    (c) from 10–45 weight percent of sodium acid pyrophosphate;
    (d) from 5–45 weight percent of glass fiber; and
    (e) from 0–5 weight percent of a polytetrafluoroethylene drip inhibitor.

18. A composition as defined in claim 1, consisting essentially of:

(a) from 25–65 weight percent of polyethylene terephthalate;

(b) from 25–65 weight percent of a brominated aromatic polycarbonate;

(c) from 10–45 weight percent of sodium acid pyrophosphate;

(d) from 5–45 weight percent of glass fiber; and (e) from 0–5 weight percent of a polytetrafluorotethylene drip inhibitor.

19. A composition as defined in claim 1 consisting essentially of:

(a) from 25–70 weight percent of polybutylene terephthalate;

(b) from 25–65 weight percent of brominated polycarbonate;

(c) from 10–45 weight percent of sodium acid pyrophosphate; and (d) from 0–5 weight percent of a polytetrafluoroethylene drip inhibitor.

20. A method of imparting flame resistance to a polyester resin composition, said method comprising adding to said polyester resin composition an effective amount of a halogenated flame retardant absent an antimony containing synergist and a retardant enhancing additive consisting essentially of metal acid pyrophosphate of the formula:

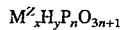

$$M^z_x H_y P_n O_{3n+1}$$

wherein M is a metal selected from the group consisting of alkali metals and alkaline earth metals, x is a number from 1 to 12, and y is a number in the range of 1 to 12, n is a number from of 2 to 10; z is a number from 1 to 5, and the sum of xz+y is equal to n+2 wherein said metal acid pyrophosphate is present in an amount sufficient to enhance the flame retardancy to a VO flame rating under Underwriters Laboratories Test No. 94.

21. A composition as defined in claim 1, wherein the metal acid pyrophosphate is selected from the group consisting of $K_2H_2P_2O_7$, $Na_4P_2O_7$, $KNaH_2P_2O_7$ and $Na_2H_2P_2O_7$.

22. A composition as defined in claim 11, wherein the metal acid pyrophosphate is selected from the group consisting of $K_2H_2P_2O_7$, $Na_4P_2O_7$, $KNaH_2P_2O_7$ and $Na_2H_2P_2O_7$.

* * * * *